United States Patent Office 2,909,496
Patented Oct. 20, 1959

2,909,496

REACTION PRODUCTS OF POLYEPOXIDES AND MONOMERIC PARTIAL ESTERS OF POLYHYDRIC ALCOHOLS WITH MALEIC ANHYDRIDE-UNSATURATED ORGANIC ACID ADDUCTS, AND METHODS AND COMPOSITIONS FOR PRODUCING THE SAME

Harold G. Cooke, Jr., and John E. Masters, Louisville, Ky., assignors to Devoe & Raynolds Company, Inc., Louisville, Ky., a corporation of New York No Drawing. Application July 19, 1955
Serial No. 523,103

9 Claims. (Cl. 260—22)

This invention relates to epoxide resin compositions and their reaction to form new reaction products and to the resulting products. The compositions and products of the invention are useful for adhesives, for molding and castings, in making pigmented and unpigmented coatings for wood, glass, metal, etc.

The compositions used in carrying out the present invention and in making the new reaction products are epoxide resins or polyepoxides and converters therefor which are partial esters made by esterifying with polyhydric alcohol adducts of unsaturated fatty and rosin acids with maleic anhydride. The partial esters used as converters with the epoxide resins are made by heating the adduct and polyhydric alcohol in proportions of about 1 mol of adduct per hydroxyl group of the polyhydric alcohol.

The adducts which are used for reaction with the polyhydric alcohol to form the partial esters are adducts of maleic anhydride with unsaturated monocarboxylic acids of the fatty acid and rosin type. These adducts are readily prepared by heating approximately equivalent proportions of the reactants at 400° F. to 500° F. for from ½ to 2 hours. The adducts contain, in addition to a carboxyl group, a dibasic anhydride functional group. The acids used in making the adducts include rosin acids such as abietic acid, etc. and unsaturated fatty acids such as linseed oil fatty acids, soya oil fatty acids, dehydrated castor oil fatty acids, China-wood oil fatty acids, linolenic acids and other similar unsaturated fatty acids. Mixtures of rosin acids and of fatty acids can be used, such as are present, for example, in tall oil, in making the adducts. Illustrative methods of making the adducts are given below in Examples 1–3.

When these adducts are reacted with polyhydric alcohols, in the proportion of 1 mol of adduct per hydroxyl group of the polyhydric alcohol, the anhydride group of the adduct reacts with an alcoholic group of the polyhydric alcohol, by direct addition, to form a partial ester, at the same time setting free a carboxyl group from each anhydride group reacted.

Thus, for example, the adduct produced from abietic acid and maleic anhydride will contain 1 anhydride group and 1 free carboxyl group. When 2 mols of this adduct are reacted with 1 mol of a dihydric alcohol such as ethylene glycol, the 2 mols of adduct will react through their anhydride groups with the dihydric alcohol to form a partial ester, and simultaneously set free carboxyl groups, so that the resulting partial ester will contain 4 free carboxyl groups per molecule of partial ester.

Partial esters containing a wide range in functionality are obtainable in this way. As the adducts are reacted with the polyhydric alcohols in the ratio of 1 mol of adduct per available hydroxyl group of the polyhydric alcohol, the number of carboxyl groups in the resulting partial ester will be twice that of the hydroxyl groups of the alcohol. For example, if $n$ equals the number of hydroxyl groups in the polyhydric alcohol, the number of carboxyl groups in the partial ester will equal $2n$. Thus, where 2 mols of the adduct react with 1 mol of dihydric alcohol as above illustrated, the resulting partial ester will contain 4 carboxyl groups per mol; while a partial ester of a trihydric alcohol will contain 6 carboxyl groups, etc.

The adducts used may be unsaturated fatty acid adducts with maleic anhydride or rosin maleic anhydride adducts, as well as mixtures of these adducts.

The polyhydric alcohols or polyhydroxy compounds which are useful for the esterification of the adducts to form partial esters include aliphatic alcohols such as ethylene glycol, polyethylene glycol, etc., glycerol, pentaerythritol, etc. One form of polyhydric alcohol or polyhydroxy compound which is advantageously used for reacting with the adducts to form the partial esters is that prepared by the reaction of dihydric phenols such as bisphenol with epichlorohydrin and ethylene chlorhydrin, as described, for example, in U.S. Patent 2,558,949 and illustrated in Example 4. These polyhydric alcohols or polyhydroxy compounds are all high molecular weight and resinous in character and can readily be converted into partial esters by reacting 2 or more of the alcoholic hydroxyl groups with the adducts.

The epoxide resins or polyepoxides which are used in making the new compositions are epoxides which in general contain more than 1 epoxide group per molecule.

Epoxide resins such as are produced by the reaction of dihydric phenols with epichlorohydrin or glycerol dichlorhydrin in the presence of caustic alkali are advantageously used with the partial esters as converters in the compositions and in making the products of the present invention. These epoxide resins include liquid or low melting point epoxide resins which are diglycide ethers of dihydric phenols or products containing such diglycide ethers as their principal constituents. They also include epoxide resins of higher melting points and more or less polymeric in character, such as are described, for example, in U.S. Patents 2,582,985 and 2,615,007, and higher melting point epoxide resins such as described in U.S. Patent 2,615,008.

Epoxide resins which can advantageously be used in making the new compositions also include resins made from polyhydric phenols and aliphatic polyepoxides, as described, for Example, in U.S. Patent 2,592,560.

Another type of epoxide resins or polyepoxides advantageously used with the partial esters in making the new compositions are aliphatic polyepoxides such as diglycide ether or aliphatic polyepoxides made from glycerin, as described, for example, in U.S. Patent 2,581,464.

Another type of polyepoxides which can advantageously be used in making the new compositions are the epoxidized esters of unsaturated fatty acids, as described, for example, in U.S. Patent 2,485,160.

The polycarboxylic nature of the partial esters used as converters according to the present invention makes them particularly advantageous as converting agents or cross-linking agents for epoxide resins and polyepoxides, since each of the carboxyl groups can react with an epoxy group of the resin by direct addition reaction. The use of these polycarboxylic acid partial esters is particularly advantageous where the epoxide resins or polyepoxides contain only reactive epoxide groups.

An advantageous proportion of the polycarboxylic acid partial ester with the epoxide resin or polyepoxide is the ratio in which 1 carboxyl functionality is present per epoxide group in the polyepoxide or epoxide resin used. The invention, however, is not limited to the use of equivalent proportions. Useful products have been obtained using an excess of epoxide as well as an excess of partial ester.

Instead of using a single partial ester with the epoxide resins in making the new compositions and reaction products, mixtures of such partial esters can be used.

So also, the partial esters can be advantageously used in admixture with adducts containing an unreacted anhydride group, as well as the carboxyl group. The use of such adducts as converting agents for epoxide resins is described in our companion application Ser. No. 525,823 filed August 1, 1955. When such adducts are used in admixture with the partial esters, a more complex reaction is possible, since the carboxyl groups of both the adducts and the polycarboxylic partial esters can react with epoxide groups of the resin, while the anhydride group of the adduct can react with alcoholic hydroxyls present in the resin or formed as a result of the reaction of the carboxyl groups with epoxide groups; and such reaction of alcoholic groups with the anhydride groups will open up the anhydride group to set free a carboxyl group which can further react with epoxide groups of the resin.

The new compositions of the present invention, made of admixed polycarboxylic partial ester and epoxide resins or polyepoxides, can be reacted or cured without the use of a catalyst, but for the higher melting point polyepoxides it is advantageous to employ catalysts to promote the reaction. Particularly useful catalysts are catalysts such as triethanolamine, dimethyl amino methyl phenol (DMP-10, Rohm & Haas) and quaternary ammoniated bases such as benzyl trimethyl ammonium hydroxide.

The invention will be further illustrated by the following examples, the parts being by weight:

The first three examples illustrate the production of maleic anhydride adducts from rosin and unsaturated fatty acid. Example 4 illustrates the production of a special resinous polyhydric alcohol for use in making partial esters from the adducts. Examples 5–11 illustrate the production of partial esters from the adducts and polyhydric alcohol. Examples 12–17 illustrate the production of some of the epoxide resins or polyepoxides. The other examples illustrate the production of the new compositions and products from epoxide resins and partial esters according to the present invention.

Where the acid values or carboxyl equivalents are referred to in the following examples, the following method was used for determining the acid value indicated:

About 0.5 gram of the product was weighed into a tared 125 ml. narrow mouth Erlenmeyer flask. To this was added 25 ml. of a 3:1 mixture of benzene and ethyl alcohol that had been titrated immediately before use to a very faint pink with dilute alkali using 2 drops of 1% phenolphthalein as indicator. 3 drops more of phenolphthalein were added and the solution was titrated to a faint permanent pink end point with standardized 0.5 N alcoholic KOH solution. The acid number (milligrams of KOH to neutralize 1 gram of sample) was calculated according to the following equation:

$$\frac{\text{Ml. of KOH} \times \text{titre in milligrams}}{\text{Wt. of sample}} = \text{A.V.}$$

In the case of the acid value of the adducts, the acid value represents only about two-thirds or somewhat less, e.g., about 60%, of the theoretical value, since one of the carboxyls of the anhydride group appears to react with the ethyl alcohol, leaving only two free acid groups to give the acid value. The acid values or carboxyl equivalents of the other examples are based on the amount of titratable carboxyls obtained by the above process.

*Preparation of adducts*

*Example 1.*—Approximately equimolecular quantities of rosin (350 parts) and maleic anhydride (98 parts) were heated to 525° F. for 30 minutes to give a hard brittle product having an acid value of 333 and a weight per carboxyl group of 168. A 50% solution of the adduct in xylene had a viscosity of B and a color of 14.

*Example 2.*—Equimolar quantities of soya acids (280 parts) and maleic anhydride (98 parts) were heated to 440° F. for 1½ hours. The product had an acid value of 283 (weight per carboxyl of 198).

*Example 3.*—Equimolar quantities of linseed fatty acids (280 parts) and maleic anhydride (98 parts) were heated to 440°–450° F. for 2 hours. The product had an acid value of 285 (weight per carboxyl of 197).

*Preparation of polyhydroxy compound*

*Example 4.*—A resinous polyhydric alcohol having an average functionality of six hydroxyl groups per molecule was prepared by the reaction of 5.64 mols of Bisphenol A (p.p'-dihydroxydiphenylpropane) with 4.52 mols of epichlorohydrin and 2.25 mols of ethylene chlorohydrin in a 10% aqueous solution of 7.6 mols of sodium hydroxide. When the reaction was complete the insoluble resinous product was washed with hot water to remove salt and unreacted alkali and dried by heating to 150° C. The product which had a melting point of 98° C., had an equivalent weight per hydroxyl group of 242.

*Preparation of esters*

*Example 5.*—A mixture of 179.2 parts (0.4 mol) of the adduct of Example 1 and 12.4 parts (0.2 mol) of ethylene glycol was heated to 500° F. for 30 minutes with xylene reflux. The product, when cold, was a hard, brittle solid having an acid value of 183 and a weight per carboxyl group of 307.

*Example 6.*—A mixture of 89.6 parts (0.2 mol) of the adduct of Example 1 and 100 parts (0.1 mol) of Polyethylene Glycol–1000 (Carbide and Carbon Corporation), was heated to 500° F. for 30 minutes with xylene reflux. The product, when cold, was a viscous liquid having an acid value of 109 and a weight per carboxyl group of 515.

*Example 7.*—A mixture of 151 parts (0.4 mol) of the adduct of Example 2 and 18 parts (0.2 mol) of 1,3-butanediol was heated to 410° F. for 1 hour with xylene reflux. The product had an acid value of 162, a weight per carboxyl of 346 and a viscosity of M at 68% solids in xylene.

*Example 8.*—A mixture of 179.2 parts (0.4 mol) of the adduct of Example 1 and 14.5 parts (0.1 mol) of pentaerythritol was heated to 320°–330° F. for 1½ hours with xylene reflux. The product had an acid value of 197, a weight per carboxyl of 285. At 65.6% solids in xylene its viscosity was Z.

*Example 9.*—A mixture of 107.5 parts (0.24 mol) of the adduct of Example 1 and 57.1 parts (0.04 mol) of the polyhydric compound of Example 4 was heated at 330° F. for 1½ hours with xylene reflux. The product, which had an acid value of 150 and a weight per carboxyl of 374 was thinned to 62% solids with 50/50 xylene cellosolve acetate.

*Example 10.*—A mixture of 151 parts (0.4 mol) of the adduct of Example 3 and 12.4 parts (0.2 mol) of ethylene glycol was heated to 430° F. for 2 hours with xylene reflux. The product had an acid value of 138 (weight per carboxyl of 406) and a viscosity of N at 70.2% solids in xylene.

*Example 11.*—A mixture of 113.4 parts (0.3 mol) of the adduct of Example 3 and 9.2 parts (0.1 mol) of glycerol was heated to 320° F. for 1½ hours with xylene reflux. The product had an acid value of 193, a weight per carboxyl of 291 and a viscosity of $Z_2$ at 53.2% solids in xylene.

*Preparation of epoxides*

Examples 12–16 illustrate different epoxide resins, and Example 17, an epoxidized oil. The epoxide resin of Example 12 is a liquid aliphatic polyepoxide such as described in U.S. Patent 2,581,464. Examples 13, 14, 15 and 16 are epoxide resins produced from bisphenol and epichlorhydrin in the presence of caustic alkali, Example 13 illustrating liquid resin made up mainly of the diglycide ether of bisphenol, and Examples 14 to 16 illustrating higher melting point epoxide resins.

*Example 12.*—The resin was an aliphatic epoxide resin produced as described in U.S. Patent 2,581,464 by reacting glycerol with epichlorhydrin to form the chlorhydrin ether and dehydrohalogenating this ether to form the polyepoxide. This resin had a weight per epoxide of 155, a molecular weight of about 320, and was a viscous liquid.

*Example 13.*—This resin was a polyepoxide resin having a melting point of 9° C., a weight per epoxide of 200, a molecular weight of about 360, and a weight per hydroxyl group of about 1110; was produced by the reaction of bisphenol with an excess of epichlorhydrin sufficient to act as a solvent and also to react with the bisphenol in the presence of about 2.04 mols of sodium hydroxide; and was made up largely of the diglycide ether of bisphenol.

*Example 14.*—This resin was made by the reaction of 1.4 mols of epichlorhydrin with 1 mol of bisphenol in the presence of 1.68 mols of sodium hydroxide and had a melting point of 84° C., a weight per epoxide of 592, a molecular weight of about 791, and a weight per hydroxyl of 233.

*Example 15.*—This resin was made by the reaction of 1.22 mols of epichlorhydrin with 1 mol of bisphenol in the presence of 1.46 mols of sodium hydroxide, and had a melting point of 98° C., a weight per epoxide of 900, a molecular weight of about 1400, and a weight per hydroxyl of 228.

*Example 16.*—This resin was made by further reacting the epoxide resin of Example 15 with about 5% of bisphenol to form a higher melting point resin having a melting point of 130° C., a weight per epoxide of 1800, a molecular weight of about 2900 and a weight per hydroxyl of 271.

*Example 17.*—This polyepoxide was an epoxidized soya oil such as described in U.S. Patent 2,485,160 and a product sold under the trade name Paraplex G-62 (Rohm & Haas) and contained about 3.6 epoxy groups per mol, a weight per epoxide of 257, and a molecular weight of about 935.

*Reaction of esters and epoxides*

*Example 18.*—To 61.4 parts (0.1 carboxyl equivalent) of a 50% solution of the ester of Example 5 in xylene were added 15.5 parts (0.1 epoxide equivalent) of the resin of Example 12 and 1.85 parts (4% based on solids) of triethanol amine.

A 3 mil film of this solution drawn on glass was baked at 150° C. for 1 hour to give a tough, flexible film having good water, alkali and solvent resistance.

*Example 19.*—To a solution of 180 parts (0.1 epoxide equivalent) of the resin of Example 16 in 135 parts xylene and 135 parts cellosolve acetate were added a solution of 30.7 parts (0.1 carboxyl equivalent) of the ester of Example 5 in 30.7 parts of xylene and 8.43 parts (4% based on solids) triethanol amine.

A 3 mil film of this solution drawn on glass was baked at 150° C. for 1 hour to give a tough, flexible film having good resistance to water, alkali and solvents.

*Example 20.*—To a solution of 51.5 parts (0.1 carboxyl equivalent) of the ester of Example 6 in 51.5 parts of xylene were added 20 parts (0.1 epoxide equivalent) of the resin of Example 13 and 2.86 parts (4% based on solids) of triethanol amine.

A 3 mil film of this solution drawn on glass and baked at 150° C. for 30 minutes gave a tough, fairly flexible film having good resistance to water, alkali and solvents.

*Example 21.*—To a solution of 57 parts (0.1 epoxide equivalent) of the resin of Example 14 in 28.5 parts of xylene and 28.5 parts cellosolve acetate were added a solution of 51.5 parts (0.1 carboxyl equivalent) of the ester of Example 6 in 51.5 parts of xylene and 4.42 parts (4% based on solids) of triethanol amine.

A 3 mil film of this solution drawn on glass was baked at 150° C. for 1 hour to give a tough, flexible film having good resistance to water, alkali and solvents.

*Example 22.*—To a solution of 8.3 parts (0.025 carboxyl equivalent) of the ester of Example 7 in 3.9 parts of xylene were added a solution of 22.5 parts (0.025 epoxide equivalent) of the resin of Example 15 in 17.25 parts of cellosolve acetate and 11.25 parts of xylene, and 0.9 part (1% based on solids) of a 35% solution of benzyltrimethyl ammonium hydroxide in methyl alcohol.

A 3 mil film of this solution on glass was baked at 150° C. for 30 minutes to give a tough, flexible film having good resistance to water, alkali and solvents.

*Example 23.*—To a solution of 2.9 parts (0.01 carboxyl equivalent) of the ester of Example 8 in 1.5 parts of a 50/50 xylene/cellosolve acetate solvent mixture were added 18 parts (0.01 epoxide equivalent) of the resin of Example 16 dissolved in 13.5 parts of xylene and 13.5 parts cellosolve acetate and 0.21 part (1% based on solids) of DMP-10.

This solution was thinned to application viscosity with cellosolve acetate. A 3 mil film was drawn on glass and baked for 1 hour at 150° C. to give a hard, tough film having a good resistance to water, alkali and solvents.

*Example 24.*—To 30.2 parts (0.05 carboxyl equivalent) of the ester of Example 9 (62% solids) were added 7.8 parts (0.05 epoxide equivalent) of the resin of Example 12 and 0.26 parts (1% based on solids) of DMP-10.

This solution was thinned to application viscosity with cellosolve acetate. A 3 mil film was drawn on glass and baked at 150° C. for 1 hour to give a hard, tough film having good resistance to water, alkali and solvents.

*Example 25.*—To a solution of 10.2 parts (0.025 carboxyl equivalent) of the ester of Example 10 in 4.3 parts of xylene were added 22.5 parts (0.025 epoxide equivalent of the resin of Example 15 dissolved in 11.25 parts of cellosolve acetate and 11.25 parts of xylene and 0.33 part (1% based on solids) of dimethylaminomethyl phenol (DMP-10).

This solution was thinned to application viscosity with cellosolve acetate. A 3 mil film on glass baked at 150° C. for 1 hour gave a tough, flexible film having good resistance to water, alkali and solvent.

*Example 26.*—To 27.4 parts (0.05 carboxyl equivalent) of a 53.2% solution of the ester of Example 11 in xylene were added a solution of 10 parts (0.05 epoxide equivalent) of the resin of Example 13 in 2.5 parts xylene and 0.25 part of dimethylaminomethyl phenol (DMP-10).

This solution was thinned to application viscosity with cellosolve acetate. A 3 mil film on glass baked at 150° C. for 1 hour gave a tough, flexible film having good resistance to water, alkali and solvents.

*Example 27.*—To a solution of 14.3 parts (0.05 carboxyl equivalent) of the ester of Example 8 in 3.7 parts of xylene and 3.7 parts of cellosolve acetate were added 12.8 parts (0.05 epoxide equivalent) of the epoxidized soya oil of Example 17, 6 parts cellosolve acetate and 0.78 part of a 35% solution of benzyl trimethyl ammonium hydroxide in methyl alcohol.

A 3 mil film of this solution on glass was baked at 150° C. for 45 minutes to give a fairly soft film having good adhesion to glass. The film has good resistance to water and solvents.

*Example 28.*—A solution was prepared of the following ingredients: 6.2 parts (0.01 carboxyl equivalent) of a 50% solution of the ester of Example 5 in xylene; 5.7 parts (0.01 carboxyl equivalent) of a 70.2% solution of the ester of Example 10 in xylene; 36 parts (0.02 epoxide equivalent) of a 50% solution of the resin of Example 15 in 50/50 cellosolve acetate/xylene; 5 parts cellosolve acetate; and 0.7 parts of a 35% solution of benzyltrimethyl ammonium hydroxide in methyl alcohol.

A 3 mil film of the above solution on glass was baked at 150° C. for 30 minutes to give a tough, flexible film having good resistance to water, alkali and solvents.

*Example 29.*—A series of admixtures were made of the partial ester of Example 10 and the epoxide resin of Example 13, in the proportions respectively of 0.68, 1.0, 1.35 and 2.0 epoxide equivalents of the resin to 1 carboxyl equivalent of the partial ester and with the addition of 1% (based on total solids) dimethylaminomethyl phenol (DMP–10). 3 mil films on glass were baked at 150° C. for 1 hour. The first and third of these films had good flexibility and mar resistance and fair hardness and acetone resistance. The second of these films had good flexibility, mar resistance and acetone resistance, and fair hardness. The fourth of these films had good flexibility and fair hardness, mar resistance and acetone resistance.

*Example 30.*—A series of admixtures were made of the partial ester of Example 8 and the epoxide resin of Example 15, in the proportions respectively of 0.59, 1.0, 1.79 and 2.85 epoxide equivalents of the resin to 1 carboxyl equivalent of the ester and with the addition of 1% (based on total solids) dimethylaminomethyl phenol (DMP–10). 3 mil films on glass were baked at 150° C. for 1 hour. The first of these films had good hardness, fair acetone resistance and poor flexibility and mar resistance. The second of these films had good hardness and acetone resistance and fair flexibility and mar resistance. The third of these films had good flexibility, hardness, mar resistance and acetone resistance. The fourth of these films had good flexibility, hardness and mar resistance and fair acetone resistance.

The polycarboxylic partial esters used as converters for the epoxide resins and polyepoxides have the advantage that they are relatively inexpensive as compared with the epoxy compounds, that they are high molecular weight polycarboxylic compounds, and because of their polycarboxylic acid character are valuable cross-linking converters for forming ultimate insoluble and infusible reaction products.

We claim:

1. The method of converting epoxide resins which are glycidyl polyethers of a member selected from the class consisting of polyhydric phenols and polyhydric alcohols and which are free from reactive groups other than epoxy and aliphatic hydroxyl groups into cross-linked insoluble and infusible products, which comprises heating the epoxy compounds to a reaction temperature with a monomeric partial ester of a polyhydric alcohol with one mol, for each hydroxyl group of the polyhydric alcohol, of a maleic anhydride unsaturated monocarboxylic acid adduct having an acid anhydride group and a free carboxyl group, said adduct being an adduct of maleic anhydride, with an unsaturated monocarboxylic acid selected from the class consisting of rosin acids and drying oil fatty acids, and said partial ester having at least 4 carboxyl groups, the proportions of adduct and of epoxy compound being such that there are from about 0.6 to 2.85 epoxy groups in the epoxy compound for each carboxyl group of the partial ester, and the heating being at a temperature to effect conversion and cross linking of the epoxy compound with the partial ester to form insoluble and infusible reaction products.

2. The process according to claim 1 in which the proportions of epoxy compound and partial ester are such that there is approximately 1 epoxy group of the epoxide compound for each carboxyl group of the partial ester.

3. The process according to claim 1 in which a small and effective catalytic percentage not exceeding about 5 percent of an amine catalyst is present in the reaction between the epoxy compound and the partial ester.

4. A composition capable of conversion by heating into insoluble and infusible cross-linked reaction products containing as its essential constituents (1) a glycidyl polyether of a member selected from th class consisting of polyhydric phenols and polyhydric alcohols and which are free from reactive groups other than epoxy and aliphatic hydroxyl groups, and (2) a cross-linking converter therefor which is a monomeric partial ester of a polyhydric alcohol with one mol, for each hydroxyl group of the polyhdric alcohol, of a maleic anhydride unsaturated monocarboxylic organic acid adduct, which adduct is an adduct of maleic anhydride with an unsaturated monocarboxylic acid selected from the class consisting of rosin acids and unsaturated drying oil fatty acids, and said partial ester having at least 4 carboxyl groups, in the proportions of from about 0.6 to about 2.85 epoxy groups of the epoxide compound to one carboxyl group of the partial ester.

5. A composition as defined in claim 4 in which the proportions of epoxy compound and partial ester are such that there is approximately 1 epoxy group of the epoxide compound for each carboxyl group of the partial ester.

6. A composition as defined in claim 4 which also contains a small and effective amount, not exceeding about 5 percent, of an amine catalyst.

7. A cross-linked insoluble and infusible reaction product resulting from the process of claim 1.

8. A cross-linked insoluble and infusible reaction product resulting from the process of claim 2.

9. A cross-linked insoluble and infusible reaction product resulting from the process of claim 3.

References Cited in the file of this patent

UNITED STATES PATENTS

| | | |
|---|---|---|
| 2,063,542 | Ellis | Dec. 8, 1936 |
| 2,461,918 | Petke | Feb. 15, 1949 |
| 2,712,535 | Fisch | July 5, 1955 |

OTHER REFERENCES

"Epon Resins," Technical Bulletin SC: 52–31, November 1952, Shell Chem. Corp., pp. 7, 10. (Copy in Div. 50.)

"Cyanamid Resins for Specification Finishes," published by Amer. Cyanamid & Chem. Corp., received by Patent Office December 1943, pp. 22. (Copy in Div. 50.)